United States Patent [19]
Eckerd

[11] Patent Number: 5,097,978
[45] Date of Patent: Mar. 24, 1992

[54] SEALING APPARATUS FOR A DISC DRIVE

[75] Inventor: Steve S. Eckerd, Oklahoma City, Okla.

[73] Assignee: Seagate Technology, Inc., Scotts Valley, Calif.

[21] Appl. No.: 675,580

[22] Filed: Mar. 8, 1991

[51] Int. Cl.⁵ .............................................. B65D 45/00
[52] U.S. Cl. .................................... 220/315; 360/132
[58] Field of Search .................. 220/315, 319, 359; 229/181, 198.2, 198.3; 360/132, 133, 137

[56] References Cited

U.S. PATENT DOCUMENTS

| | | | |
|---|---|---|---|
| 3,446,391 | 5/1969 | Yates, Jr. ....................... | 220/315 X |
| 4,174,246 | 11/1979 | Ralston ............................ | 156/391 |
| 4,311,741 | 1/1982 | Wong ............................... | 220/359 X |
| 4,418,369 | 11/1983 | Applequist et al. ............. | 360/98 |
| 4,522,679 | 6/1985 | Funakoshi et al. ............. | 156/510 |
| 4,672,487 | 6/1987 | Brand et al. ..................... | 360/97 |

Primary Examiner—Gary E. Elkins
Assistant Examiner—Nova Stucker
Attorney, Agent, or Firm—Bill D. McCarthy; Edward P. Heller, III

[57] ABSTRACT

An improved sealing apparatus for sealing a disc drive assembly from external contaminants, the sealing apparatus including modifications to a base member and to a top cover member such that these components meet at a clearance gap with the outer surfaces of these components being coplanar in the region of the clearance gap. A sealing element is provided consisting of a planar adhesive film carried on a flexible backing which bridges the clearance gap to seal the interior against external contaminants.

9 Claims, 3 Drawing Sheets

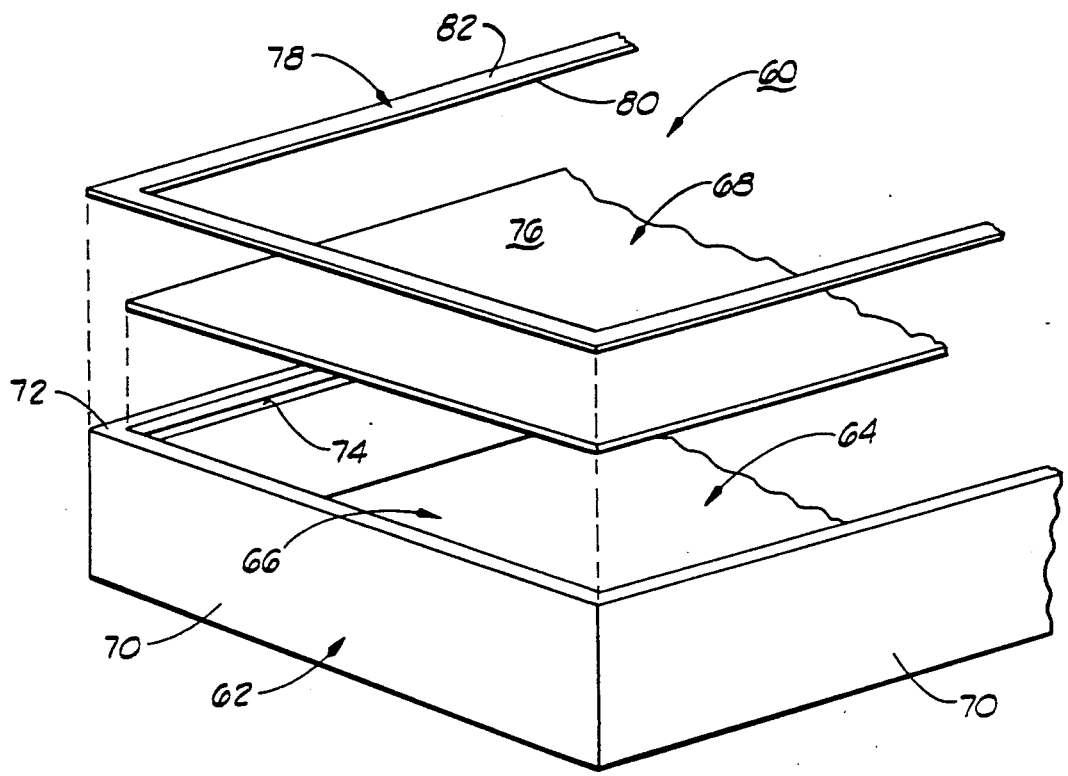
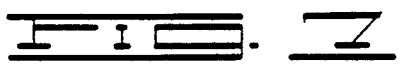
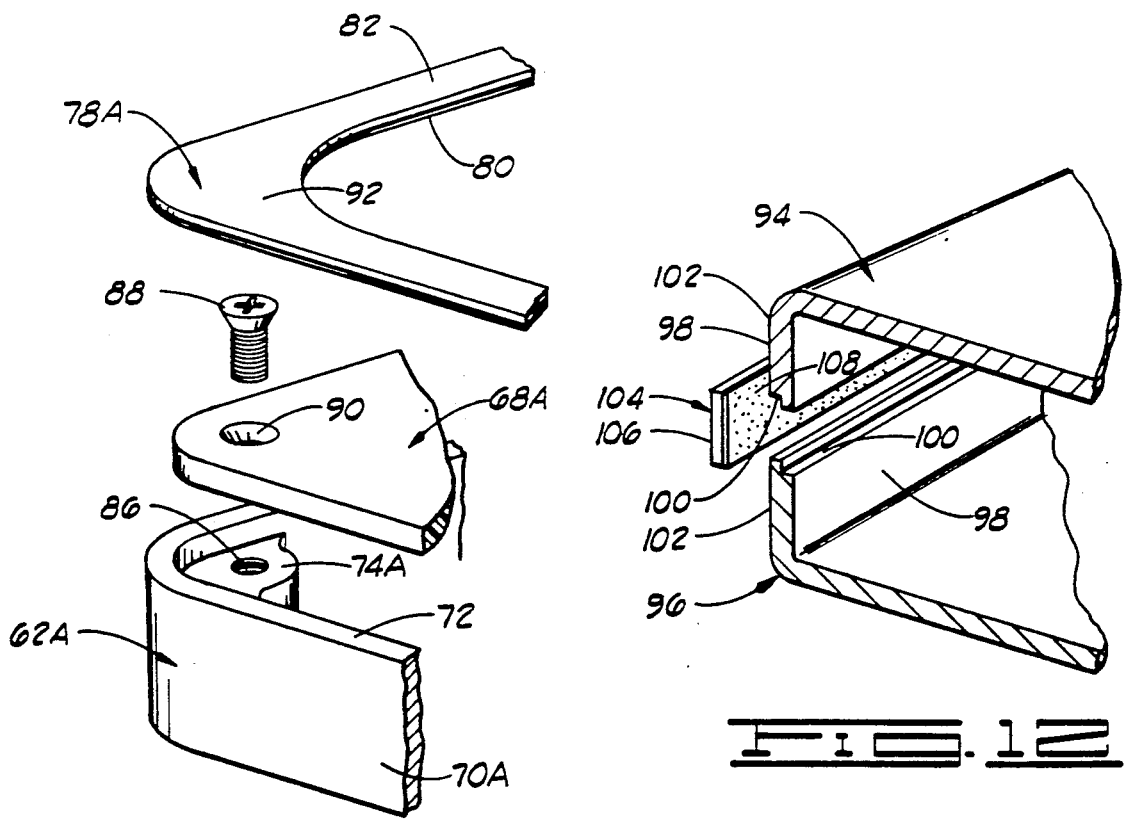
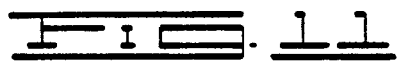

SEALING APPARATUS FOR A DISC DRIVE

BACKGROUND OF THE INVENTION

1. Field of the Invention

The present invention relates generally to the field of disc drive data storage devices, and more particularly but not by way of limitation, to an improved sealing means for preventing contaminants from entering a sealed head/disc environment.

2. Brief Description of the Prior Art

Rigid disc drive data storage devices of the type referred to as "Winchester" disc drives are well known in the industry. Such disc drives incorporate a number of disc-shaped members mounted on a spindle motor for rotation at a constant high rate of speed. These discs are coated with a thin magnetizable medium suitable for recording digital data which is stored on the discs in circular, concentric data tracks.

Data recording and retrieval is achieved by a read/write head formed either of an interrupted core element wrapped with wires or an analogous structure formed using thin-film deposition techniques. Electrical current introduced into the windings of the head induces a magnetic field in the core which extends significantly beyond the core in the area where the core is interrupted or the "gap". This magnetic field is used to magnetize the data medium to store data. When retrieving data, changes in the polarity of the magnetic flux in the medium induce small current spikes in the core windings, which are amplified and passed to read logic circuitry.

The actual read/write head mechanism is usually incorporated into a slider body that allows connection of the heads to an actuator used to move the head from track to track. The slider also serves another important purpose.

Before power is applied to the disc drive, the slider carrying the read/write head rests in direct contact with the surfaces of the discs. As the discs begin spinning, a thin layer of air is dragged along with the surface of the discs. At some point in the acceleration of the discs to operational speed, this thin layer of air interacts with ski-like features on the disc side of the slider, and the heads begin to "fly" above the disc surface on an air bearing. This means that during normal disc drive operation, the heads are not in direct contact with the discs, thus reducing wear and lessening the force necessary to move the heads from track to track.

In disc drives of the current technology, the "flying height", or distance between the head and the disc surface, is commonly less than ten microinches (0.000010 inch). A typical smoke particle or the thickness of body oil left in a finger print are on the order of ten times this size, and environmental dust is larger still. Thus, it is evident that cleanliness in the head/disc environment is of great concern in the disk drive industry.

For this reason, rigid disc drives typically are manufactured in a clean room environment and employ a sealed case, in which are enclosed the discs and the read/write heads, along with the actuator mechanicals to move the heads from track to track. Various forms of seals and gaskets have been used to insure the integrity of this sealed case, sometimes referred to also as a "bubble".

Typical disc drive designs incorporate a base casting to which are mounted all mechanical components, and a top cover attached to the base casting to complete the enclosure. Various forms of these two major components have been used:

1) a substantially planar base casting and a top cover having downward-extending sidewalls which mate with the perimeter of the base casting;

2) a pan-shaped base casting with upward-extending sidewalls and a generally planar top cover which sits on the edges of the base casting sidewalls, and;

3) a compromise configuration in which the base casting and top cover are both pan-shaped with sidewalls that meet to form the enclosed environment.

All of these configurations employ either edge-to-surface, or edge-to-edge contact.

Whichever of these configurations is used, the contact surfaces of these two parts never mate with sufficient perfection to provide sealing against the type of tiny contaminants noted above. Therefore, some sort of resilient gasket material is usually inserted between the base and top cover to insure adequate sealing, and the form which these resilient gaskets have taken is very diverse.

Die-cut foam rubber gaskets with pre-applied adhesives have frequently been used. Such gasket materials typically have voids and areas of varying density, so that an adequate seal can only be insured by compressing the foam to closely controlled tolerance. In the event that too little compression is achieved, the seal is suspect, while too much compression makes the gasket take a "set" and not reseal adequately if the "bubble" must be opened rework in manufacturing or repair at a later date.

Furthermore, commercially available foam rubbers sometimes include clay fillers which are left exposed when die-cutting is performed, or the material itself may flake and crumble when die-cut. Clearly, in such cases, the gasket becomes a source of possible contamination instead of a barrier against contamination as intended.

Various forms of molded gaskets have also been employed, again with varying degrees of success. One of the greatest drawbacks of molded gaskets is that such gaskets are typically very soft and difficult to handle and control in the manufacturing process. This makes proper alignment a tedious chore. Attempts to overcome this drawback have included molding the gasket with a U-shaped or H-shaped cross section. The edge of one or both of the mating components—or a specially formed raised lip—is then inserted in the grooves provided to facilitate alignment. Gaskets of this type are still subject to precise compression control as noted above, and the increased complexity of the mold adds significantly to the cost of the part.

Another drawback to molded gaskets is a phenomenon referred to as "outgassing". Most molded gaskets are formed of synthetic polymers which remain soft and pliable during use. However, these types of materials are subject to de polymerization—similar to evaporation—which frees molecules of the material within the sealed head/disc environment. While a single molecule would probably not be cause for concern, a large number of such molecules have been shown to re-polymerize and build up on head and disc surfaces to an extent large enough to interfere with the intended head/disc interface.

It is therefore desirable to produce a sealing method which overcomes these problems.

SUMMARY OF THE INVENTION

The present invention provides an improved housing and sealing apparatus for a disc drive assembly comprising a housing assembly having a base member and a cover member, the base member defining an internal components cavity and the cover member being shaped to substantially close the access opening. Attaching devices secure the cover member to the base member.

Sealing of the clearance gap between the peripheral edge of the cover member and the base member is provided by an adhesive strip contoured to cover the clearance gap, the adhesive strip comprising a pliable planar member with an adhesive supporting side and an adhesive film supported thereon so as to removably adhere the adhesive strip to the cover member and the base member over the clearance gap.

It is an object of the present invention to provide a sealing apparatus for a disc drive which will prevent the introduction of any contaminants from outside the head/disc environment.

A further object of the present invention is to provide a sealing apparatus for a disc drive that will not itself introduce particulates into the head/disc environment.

Another object of the present invention is to provide a sealing apparatus for a disc drive that does not outgas into the head/disc environment.

Another object of the present invention is to provide a sealing apparatus for a disc drive that is simple to implement in the manufacturing process, thus facilitating rapid production.

Another object of the present invention is to provide a sealing apparatus for a disc drive that is inexpensive to produce, thus keeping the total cost of manufacture low.

Other objects, features and advantages of the present invention will become apparent from the following detailed description when read in conjunction with the drawings and appended claims.

BRIEF DESCRIPTION OF THE DRAWINGS

The features and advantages of the present invention may best be understood by reference to the accompanying drawings, wherein:

FIG. 7 is a partial perspective of a disc drive housing illustrating an improved housing and sealing apparatus constructed in accordance with the present invention.

FIG. 11 is a partial perspective view of another embodiment of a housing and sealing apparatus constructed in accordance with the present invention.

FIG. 12 is a partial perspective view of yet another embodiment of a housing and sealing apparatus constructed in accordance with the present invention.

DETAILED DESCRIPTION

Figure 1:
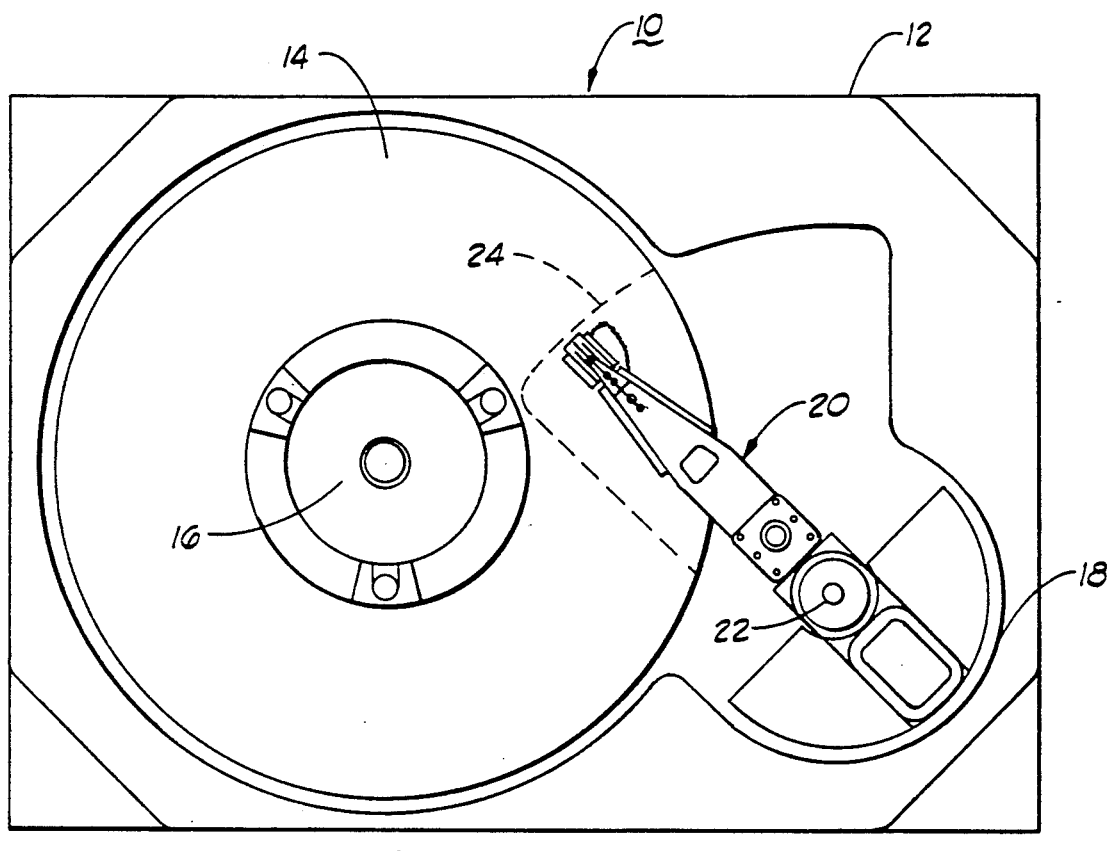
FIG. 1 is a semi-detailed, diagrammatical plan view of a typical disc drive storage device illustrating the relationship between the major mechanical components disposed in the housing thereof.

Referring to the drawings and specifically to FIG. 1, a typical disc drive data storage device 10 is shown with the top cover removed to show the internal components. The disc drive data storage device 10 includes a base casting 12. Enclosed in this base casting 12 is at least one disc 14 mounted for rotation on a spindle motor 16. An actuator motor 18 (shown in partial detail) serves to move a plurality of read/write head assemblies 20 about a pivot shaft 22, thus causing the read/write head assemblies 20 to move across the surface of the disc 14 within the area defined roughly by a dashed line arc boundary 24.

FIGS. 2 through 6 illustrate partial perspective sectional views of several prior art housings to provide a sealed head/disc environment such as the disc drive data storage device 10 of FIG. 1. Although, in the discussion to follow, certain elements are specifically designated as "base casting" and "top cover", in all of these examples, these designations could be reversed and the internal components to be protected mounted to either of these parts.

Figure 2:
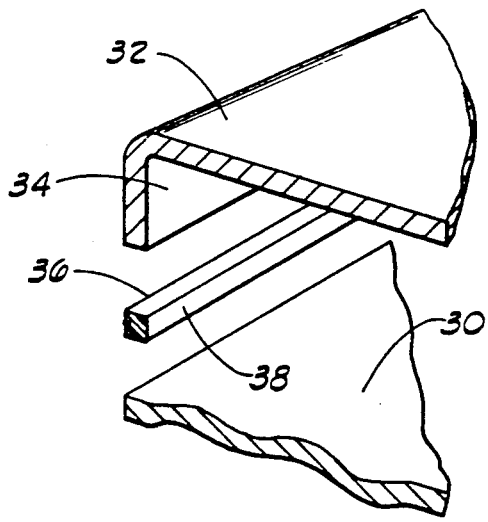
FIG. 2 is a partial, cutaway perspective representation of the mating, peripheral edges of a disc drive housing illustrating a prior art scheme for sealing a head/disc assembly.

Referring first to FIG. 2, shown therein is a very simple disc drive sealing apparatus frequently used in the prior art. In this apparatus, a generally planar base casting 30 serves to mount the spindle motor which supports and rotates the discs and the actuator mechanism which mounts and moves the read/write heads (all not shown). A top cover 32 having downward extending sidewalls 34 is dimensioned to align with the periphery of the base casting 30 and form a housing assembly which supports, and provides a sealed environment for, the internal components of the disc drive assembly. In order to insure proper sealing, a die-cut foam rubber gasket 36 is inserted between the base casting 30 and top cover 32. This gasket 36 is frequently coated with contact adhesive on its upper and lower surfaces in order to maintain the gasket 36 in proper alignment with the base casting 30 and top cover 32.

In this simplest type of sealing apparatus, a separate attaching mechanism (not shown) must be employed to fasten the top cover 32 to the base casting 30 and to limit the amount of compressive force applied to the gasket 36. Furthermore, inner surface 38 of the gasket 36 which faces the sealed environment is the surface which would be sliced when the gasket 36 is die-cut from a sheet of foam, leaving this inner surface 38 as a potential source of contamination from exposed fillers or loose chunks of the gasket material itself.

Figure 3:
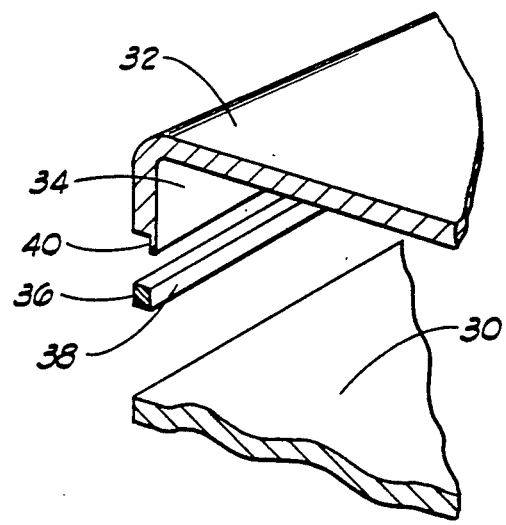
FIG. 3 is a partial, cutaway perspective representation of the mating, peripheral edges of a disc drive housing illustrating a second prior art scheme for sealing a head/disc assembly.

Shown in FIG. 3 is a variation of the apparatus shown in FIG. 2. That is, shown in FIG. 3 is a disc drive sealing apparatus which is identical in construction to that shown in FIG. 2 except that in this prior art scheme, the downward-extending sidewall 34 has a downwardly extending lip 40 which is disposed adjacent to the inner surface 38 of the gasket 36 when the base casting 30 and top cover 32 are assembled together. This lip 40 contacts the top surface of the base casting 30 and serves to limit the amount of compression of the gasket 36. This lip 40 can be a continuous feature extending completely around the periphery of the top cover 32, or may be interrupted to form a plurality of separate contact surfaces. In either case, this type of sealing apparatus suffers from the same deficiencies noted in the discussion of FIG. 2 above.

Figure 4:
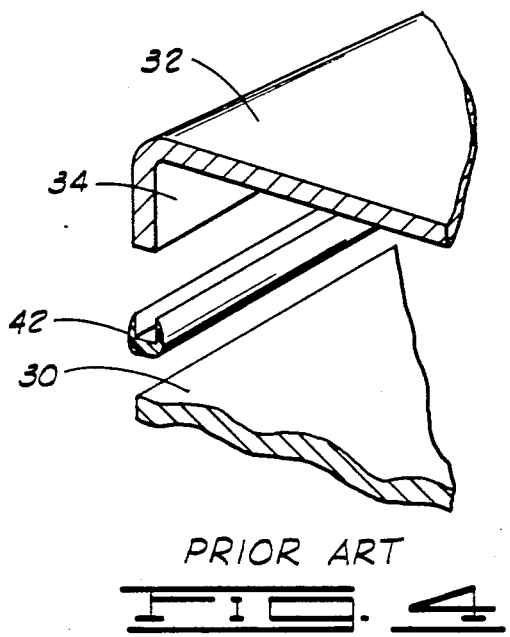
FIG. 4 is a partial, cutaway perspective representation of the mating, peripheral edges of a disc drive housing illustrating a third prior art scheme for sealing a head/disc assembly.
Figure 5:
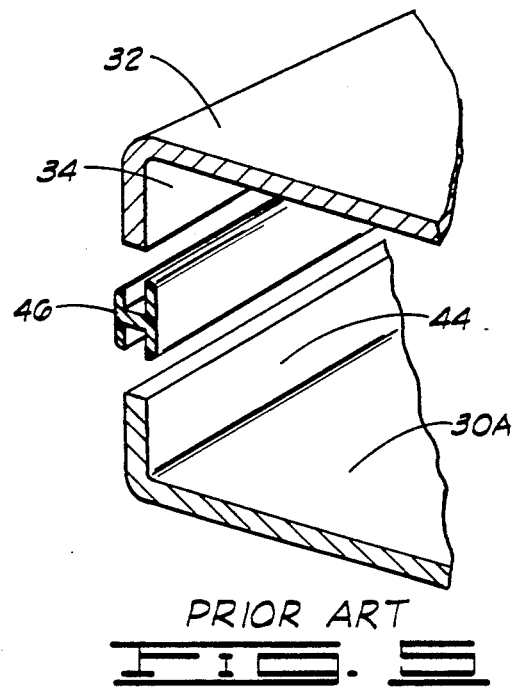
FIG. 5 is a partial, cutaway perspective representation of the mating, peripheral edges of a disc drive housing illustrating a fourth prior art scheme for sealing a head/disk assembly.
Figure 6:
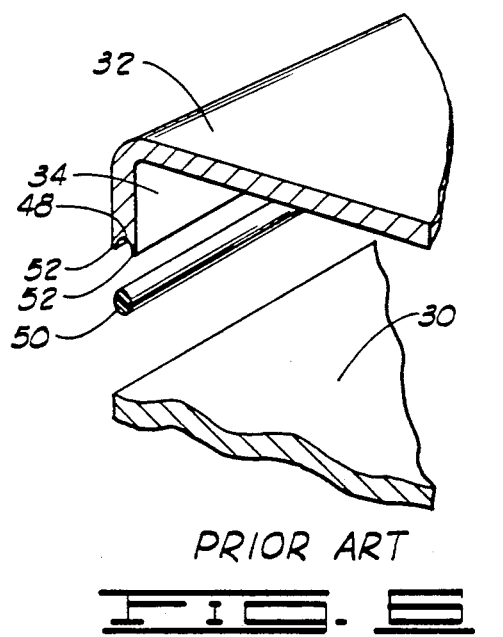
FIG. 6 is a partial, cutaway perspective representation of the mating, peripheral edges of a disc drive housing illustrating a fifth prior art scheme for sealing a head/disc assembly.

FIGS. 4, 5 and 6 show additional prior art sealing schemes which include molded gaskets. In FIG. 4, the disc drive sealing apparatus is identical in construction to that shown in FIG. 2 except that it includes a gasket 42 formed with a U-shaped cross-section dimensioned to fit over the edge of the downward-extending sidewall 34 of the top cover 32. The bottom of the gasket 42 contacts the top surface of the base casting 30 when the parts are assembled and secured together by an attaching mechanism (not shown).

In FIG. 5, a modified prior art disc drive sealing apparatus is shown in which a base casting 30A has an upward extending sidewall 44. The top cover 32 is identical in construction to that shown in FIG. 2, and a molded gasket 46 is provided having a H-shaped cross-section adapted to fit over the edges of the upward-extending sidewall 44 of the base casting 30A and the downward-extending sidewall 34 of the top cover 32. An attaching mechanism (not shown) is provided to secure together the top cover 32 and base casting 30A while limiting the compressive force on the gasket 46.

FIG. 6 shows another prior art sealing apparatus identical in construction to that shown in FIG. 2 except that the downward-extending sidewall 34 of the top cover 32 has a rounded groove 48 formed in its lower surface to receive a molded gasket 50 which is formed as a torus similar to a common O-ring. The groove 48 has inner and outer edges 52 either or both of which can be dimensioned to limit compression of the gasket 50 by contacting the upper surface of the base casting 30 upon assembly when the top cover 32 is secured thereto (by an attaching mechanism which is not shown).

The main disadvantages of the configurations shown in FIGS. 4, 5 and 6 are the costs associated with the molded gaskets and the risk of outgassing of the gaskets as discussed hereinabove.

Turning to FIG. 7, shown therein is one embodiment of the present invention. A disc drive data storage device 60 has a base casting 62 which supports the internal components (the discs, read/write head assemblies, etc., not shown) in an internal components cavity 64, the top of the base casting 62 having an access opening 66. A top cover member 68 is shaped to fit over and seal the access opening 66. The base casting 62 includes upward-extending sidewalls 70 having top edges 72. The inner portion of the top edges 72 of these sidewalls 70 has been configured to form a recessed surface 74. The top cover member 68 is dimensioned to fit within the upward-extending sidewalls 70 on the recessed surface 74. The top cover member 68 has a top surface 76 which is placed into coplanar relationship with the top edges 72 of the upward-extending sidewalls 70 of the base casting 62.

A sealing element 78 is provided, consisting of an adhesive film 80 on a pliable planar backing member 82, sometimes also referred herein as flexible backing, to bridge the seam formed between the top surface 76 of the top cover member 68 and the top edges 72 of the upward-extending sidewalls 70 of the base casting 62. This arrangement of parts is perhaps best seen by referring to FIG. 8.

Figure 8:
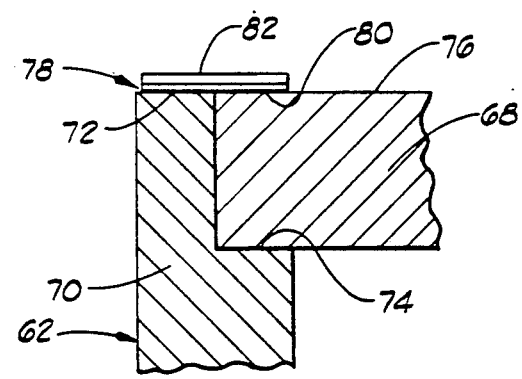
FIG. 8 is a partial cross-section of the disc drive housing of FIG. 7 illustrating the mating peripheral edges of the housing and sealing apparatus of the present invention.

FIG. 8 is a sectional view of a portion of the upward extending sidewall 70 of the base casting 62, and a portion of the top cover member 68. As can be seen, the inner portion of the top of the sidewall 70 has been configured to create the recessed surface 74 upon which the top cover member 68 rests. The sealing element 78 is shown bridging the seam between the top surface 76 of the top cover member 68 and the top edge 72 of the upward-extending sidewall 70 and extending far enough onto the outer surface of the sidewall 70 of the base casting 62 and the top surface 76 of the top cover member 68 to create an air-tight seal.

Figure 9:
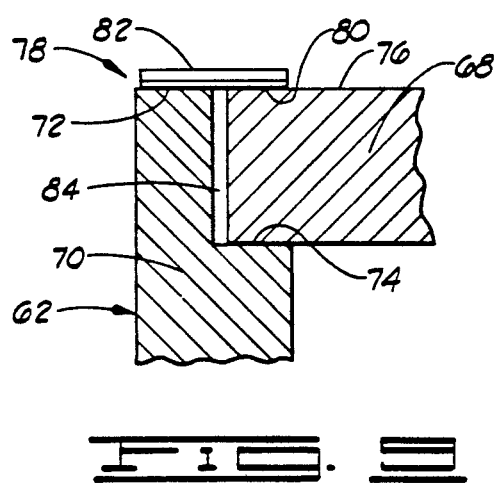
FIG. 9 is a view similar to FIG. 8 illustrating an advantage of the present invention.
Figure 10:
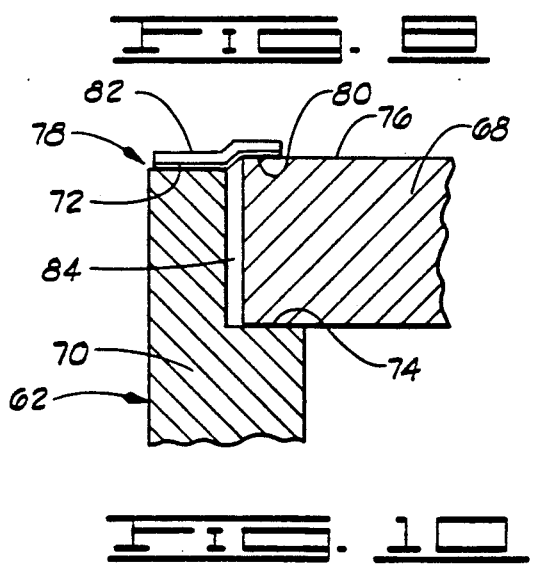
FIG. 10 is a view similar to FIG. 7 illustrating another advantage of the present invention.

Additional advantages of the present invention are illustrated by FIGS. 9 and 10. FIG. 9 is a partial sectional view similar to that of FIG. 8. However, in FIG. 9 a small clearance gap 84 is shown between the top cover member 68 and the upward-extending sidewall 70. This clearance gap 84 is representative of the kind of manufacturing tolerance that can occur in high volume manufacturing, and—although greatly exaggerated for illustrative purposes—shows that the sealing element 78 bridges the seam to provide an air-tight seal.

FIG. 10 illustrates another type of tolerance error. The same clearance gap 84 is shown, and additionally, the top surface 76 of the top cover member 68 is shown somewhat upwardly displaced such that it is not truly coplanar with the top edge 72 of the upward-extending sidewall 70. This can result from variation in the thickness of the top cover member 68 or from tolerance buildup when the recessed surface 74 is formed. In either case, the nature of the sealing element 78 with its planar backing member 82 compensates for such minor variations from true coplanarity between the top surface 76 of the top cover member 68 and the top edge 72 of the upward-extending sidewall 70 of the base casting 62. In fact, such "forgiveness" of the sealing apparatus of the present invention permits forming of the various parts by simple low cost processes, thus eliminating the need for expensive tight tolerance control.

The recessed surface 74 on which the top cover member 68 rests, as shown in FIGS. 7 through 10, can be either a continuous surface supporting the top cover member 68 along its entire periphery or can be interrupted forming a selected number of separate contact surface. Such an embodiment is shown in FIG. 11.

In FIG. 11, a base casting 62A includes upward-extending sidewalls 70A. A recessed surface 74A on which the top cover member 68A rests occurs only in selected locations interior to the sidewalls 70A. FIG. 11 illustrates such a recessed surface 74A located in a corner of the base casting 62A. In the embodiment shown, the recessed surface 74A further includes a tapped hole 86 adapted to receive a machine screw 88 which passes through a chamfered hole 90 in a top cover 68A to fasten the top cover 68A to the base casting 62A. The hole 90 presents another potential entry point for contamination, so a widened section 92 is provided in a sealing element 78A to seal the hole 90. Thus, when the sealing element 78A is applied to the assembled base casting 62A and top cover 68A, the sealing element 78A not only seals the seam between the top cover 68A and the base casting 62A, but simultaneously seals the openings provided for assembly.

FIG. 12 shows yet another embodiment of the sealing apparatus of the present invention. In this embodiment, a top cover member 94 and a base casting member 96 have been modified to include downward-extending and upward-extending sidewalls 98 in a manner similar to the prior art example of FIG. 5. However, in this embodiment, the edges of the sidewalls 98 of both the top cover member 94 and the base casting member 96 have been formed to create interconnecting recessed surfaces 100 which align the base casting member 96 and top cover member 94. When the base casting member 96 and top cover member 94 are assembled together and secured together by an attaching mechanism (not shown), outer surfaces 102 of both parts meet in a coplanar manner which is then sealed using a sealing element 104 of the present invention. Again, small clearance gaps in the area of the joint between the components and variations from true coplanarity will be compensated for by the flexible nature of the sealing element 104.

A further advantage of the present invention is that the sealing element 104, having a strong flexible backing 106 and an adhesive film 108, is easily removed from its position bridging the seam between the top cover and the base casting, should such removal be necessary for rework during the manufacturing process or for repair access at a later time. The inexpensive nature of the sealing element described herein allows the manufacturer to discard the used sealing element and replace it with an inexpensive new sealing element.

Testing has shown the sealing apparatus of the present invention to be extremely effective in sealing a head/disc assembly from outside contaminants. Such testing has also shown that certain materials are particularly suitable for use in the two-part sealing element. Forming the backing of a polyester film or of an acetate film provides a backing strong enough to allow the removability noted above while being flexible enough to compensate for minor variations from coplanarity. Selecting the planar adhesive carried on this flexible backing from the family of acrylics has provided adequate adhesion while minimizing the risk of outgassing.

The exact configuration of a top cover and a mating base casting element that conform with the intent of the present invention is a matter of design choice, so long as the juncture between these parts is such that the outer surfaces of these parts lie in a substantially coplanar relationship. Similarly, the sealing element—consisting of an adhesive film on a strengthening flexible backing—can be die-cut from sheet formed material if the entire seam to be sealed lies in a single plane, or formed as a continuous strip and cut to the desired length at the point of manufacture.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An improved housing and sealing apparatus for a disc drive assembly comprising:
    housing means for containing and protecting internal components of the disc drive assembly, the housing means comprising:
        a base member defining an internal components cavity and having an access opening;
        a cover member having a peripheral edge and shaped to substantially close the access opening; and
    attaching means for securing the cover member to the base member in a position to close the access opening and leaving a clearance gap between the peripheral edge of the cover member and the base member, the base member and cover member being connected so that the outer surfaces of the base member and the cover member meet in a substantially coplanar relationship at the clearance gap, the attaching means comprising at least one screw member extendible through a hole in one of the base member and cover member and receivable in a tapped hole in the other one of the base member and cover member; and
    sealing means for sealing the clearance gap, the sealing means comprising an adhesive strip contoured to cover the clearance gap, the adhesive strip comprising a pliable planar member having an adhesive supporting side and an adhesive supported by the adhesive supporting side so that the adhesive strip is removably adherable to the cover member and the base member in sealing disposition over the clearance gap, the sealing means adhered to the outer surfaces of the base member and cover member so as to bridge the clearance gap and extend from the clearance gap onto the outer surfaces of the base member and the cover member to insure complete sealing of the clearance gap, a portion of the sealing means dimensioned to seal over each screw member of the attaching means.

2. The improved housing and sealing apparatus of claim 1 wherein the planar member is formed of polyester film.

3. The improved housing and sealing apparatus of claim 1 wherein the planar member is formed of acetate.

4. The improved housing and sealing apparatus of claim 1 wherein the adhesive is selected from the family of acrylics.

5. An improved sealing apparatus for a disc drive assembly wherein the disc drive assembly has a base member to which internal components are mounted and a cover member adapted for attachment to the base member to form a housing structure within which the internal components are housed, the sealing apparatus comprising:
    support means for causing the base member and the cover member to join at a clearance gap with the outer surfaces of the base member and the cover member lying in substantially the same plane at the clearance gap; and
    sealing means for sealing the clearance gap, the sealing means comprising an adhesive film supported by a flexible planar backing member formed and dimensioned to be removably adherable to the outer surfaces of the base member and the cover member at the clearance gap, the backing member and adhesive film bridging the clearance gap and extending onto the base member and the cove member adjacent to the clearance gap to cover and close the clearance gap so that the housing structure provides protection for the internal components against contamination from external sources.

6. The improved sealing apparatus of claim 5 wherein the backing member is formed of polyester film.

7. The improved sealing apparatus of claim 5 wherein the backing member is formed of an acetate film.

8. The improved sealing apparatus of claim 5 wherein the adhesive film is selected from the family of acrylics.

9. The improved sealing apparatus of claim 5 wherein the cover member is attached to the base member by at least one screw member, and wherein the sealing means is dimensioned to seal over each screw member.

* * * * *

UNITED STATES PATENT AND TRADEMARK OFFICE
CERTIFICATE OF CORRECTION

PATENT NO. : 5,097,978

DATED : March 24, 1992

INVENTOR(S) : Steve S. Eckerd

It is certified that error appears in the above-identified patent and that said Letters Patent is hereby corrected as shown below:

Column 2, line 31, delete "opened rework" and substitute therefor --opened for rework--;

Column 7, line 54, delete "backin-" and substitute therefor --back- --;

Column 7, line 55, delete "g--can" and substitute therefor --ing--can--; and

Column 8, line 67, delete "cove" and substitute therefor --cover--.

Signed and Sealed this

Fifth Day of October, 1993

Attest:

BRUCE LEHMAN

Attesting Officer

Commissioner of Patents and Trademarks